(12) United States Patent
Miller et al.

(10) Patent No.: US 12,173,658 B2
(45) Date of Patent: Dec. 24, 2024

(54) ACCESSORY GEARBOX FOR A TURBINE ENGINE

(71) Applicant: General Electric Company, Schenectady, NY (US)

(72) Inventors: Brandon Wayne Miller, Liberty Township, OH (US); John Carl Glessner, Kings Mill, OH (US); Lawrence William Nurre, West Chester, OH (US); Ian Francis Prentice, Cincinnati, OH (US); Ethan Patrick O'Connor, Hamilton, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/085,714

(22) Filed: Dec. 21, 2022

(65) Prior Publication Data
US 2023/0119477 A1    Apr. 20, 2023

Related U.S. Application Data

(63) Continuation of application No. 17/037,027, filed on Sep. 29, 2020, now Pat. No. 11,572,838.

(51) Int. Cl.
| | | |
|---|---|---|
| *F02C 7/32* | (2006.01) | |
| *F01D 25/24* | (2006.01) | |
| *F02C 3/06* | (2006.01) | |

(52) U.S. Cl.
CPC ............... *F02C 7/32* (2013.01); *F01D 25/24* (2013.01); *F02C 3/06* (2013.01); *F05D 2250/313* (2013.01); *F05D 2250/75* (2013.01); *F05D 2260/40* (2013.01)

(58) Field of Classification Search
CPC ........................................................ F02C 7/32
See application file for complete search history.

(56) References Cited

U.S. PATENT DOCUMENTS

| | | | | | |
|---|---|---|---|---|---|
| 2,951,395 | A | * | 9/1960 | Smith ....................... | F02C 7/32 74/423 |
| 2,978,209 | A | * | 4/1961 | Kerry ..................... | B64D 27/18 244/54 |
| 3,543,588 | A | * | 12/1970 | Richardson ............... | F02C 7/32 60/798 |
| 3,638,421 | A | | 2/1972 | Chilman | |
| 3,714,779 | A | * | 2/1973 | Stein ........................ | F02C 7/32 60/796 |
| 5,694,765 | A | | 12/1997 | Hield et al. | |

(Continued)

FOREIGN PATENT DOCUMENTS

| | | |
|---|---|---|
| CN | 111197535 A | 5/2020 |
| EP | 0659234 A1 | 6/1995 |

(Continued)

*Primary Examiner* — Todd E Manahan
*Assistant Examiner* — Marc Amar
(74) *Attorney, Agent, or Firm* — McGarry Bair PC (57) ABSTRACT

A turbine engine that includes an engine core, an inner cowl, an outer cowl and an accessory gearbox. The engine core includes at least a compressor section, a combustion section, and a turbine section in axial flow arrangement. The accessory gearbox is operably coupled to the engine core and includes a first portion and a second portion.

20 Claims, 6 Drawing Sheets

(56) References Cited

U.S. PATENT DOCUMENTS

| | | |
|---|---|---|
| 8,074,455 B2 | 12/2011 | Pierrot et al. |
| 9,297,314 B2 | 3/2016 | Cloft et al. |
| 9,689,314 B2 | 6/2017 | Lemarchand et al. |
| 10,731,566 B2 | 8/2020 | Alstad |
| 11,572,838 B2* | 2/2023 | Miller .................. F01D 25/24 |
| 2004/0065091 A1* | 4/2004 | Anderson .............. F02C 7/268 |
| | | 60/788 |
| 2006/0101804 A1* | 5/2006 | Stretton ................ F02K 3/04 |
| | | 60/226.1 |
| 2006/0248900 A1 | 11/2006 | Suciu et al. |
| 2009/0188334 A1 | 7/2009 | Merry et al. |
| 2010/0107650 A1* | 5/2010 | Ress, Jr. ................ F02C 7/32 |
| | | 290/52 |
| 2011/0154827 A1* | 6/2011 | Ress, Jr. ................ F02C 7/32 |
| | | 60/39.15 |
| 2011/0284328 A1* | 11/2011 | Brandt .................. F02C 7/32 |
| | | 184/6.11 |
| 2012/0317991 A1* | 12/2012 | Frost .................... F02C 7/32 |
| | | 60/784 |
| 2013/0239576 A1* | 9/2013 | Kupratis ............... F02C 9/18 |
| | | 60/805 |
| 2014/0090386 A1 | 4/2014 | Cloft et al. |
| 2015/0233300 A1 | 8/2015 | Cloft et al. |
| 2016/0146111 A1 | 5/2016 | Prunera-Usach et al. |
| 2016/0186598 A1 | 6/2016 | Cloft et al. |
| 2016/0245183 A1* | 8/2016 | Viel ...................... F02C 7/32 |
| 2016/0281605 A1 | 9/2016 | Snecma |
| 2016/0333792 A1* | 11/2016 | Viel ..................... F01D 25/18 |
| 2017/0122122 A1* | 5/2017 | Lepretre ............... F01D 25/16 |
| 2019/0048801 A1 | 2/2019 | Guillemont et al. |
| 2019/0218978 A1* | 7/2019 | Edwards ............... F02C 7/268 |
| 2020/0025033 A1* | 1/2020 | White ................... F02C 7/06 |
| 2020/0157966 A1 | 5/2020 | Huang et al. |
| 2021/0087971 A1* | 3/2021 | Emmanouil ........... F02C 7/04 |
| 2021/0404386 A1* | 12/2021 | Venter .................. F01D 15/12 |
| 2021/0404387 A1* | 12/2021 | Venter .................. F02C 7/32 |

FOREIGN PATENT DOCUMENTS

| | | |
|---|---|---|
| EP | 3273032 A2 | 1/2018 |
| FR | 2994585 A1 | 2/2014 |
| GB | 839961 | 6/1960 |
| GB | 839961 A * | 6/1960 |

\* cited by examiner

ACCESSORY GEARBOX FOR A TURBINE ENGINE

CROSS-REFERENCE TO RELATED APPLICATION

This application is a continuation application of U.S. patent application Ser. No. 17/037,027, filed Sep. 29, 2020, now U.S. Pat. No. 11,572,838, issued Feb. 7, 2023, which is hereby incorporated herein by reference in its entirety.

TECHNICAL FIELD

This disclosure relates to an accessory gearbox, more specifically, an accessory gearbox for a turbine engine.

BACKGROUND

Gas turbine engines often include an accessory gearbox to power or drive accessory systems such as fuel pumps, lubrication pumps, air compressors, scavenge pumps, electrical generators, hydraulic pumps, etc. The accessory gearbox can be driven by one or more components of the gas turbine engine. When powered or mechanically driven by the gas turbine engine, the accessory gearbox can interface with the accessory systems that require different rotational input, torque, or horsepower.

BRIEF DESCRIPTION OF THE DRAWINGS

A full and enabling disclosure, including the best mode thereof, directed to one of ordinary skill in the art, is set forth in the specification, which refers to the appended figures in which.

In the drawings.

DETAILED DESCRIPTION

One or more aspects described herein provide an accessory gearbox (AGB) provided with an engine core of a turbine engine. The accessory gearbox includes a first portion and second portion. The first portion of the AGB is located within an inner cowl and straddles the engine core. The second portion, formed with or operably coupled to the first portion, extends at least partially between the inner cowl and the outer cowl. In this manner, the core mounted accessory gearbox includes components that extend beyond the inner cowl into the bifurcated airflow between the inner cowl and the outer cowl, which allows for a more aerodynamic fairing.

Further, the first and second portions of the AGB can provide power to interfaces defined by at least three different planes. The location of the core mounted AGB allows for easier access to the AGB and other components or systems within the turbine engine such as, but not limited to, fuel lines.

For purposes of illustration, the present disclosure will be described with respect to a turbine engine for an aircraft. The disclosure can have applicability in a variety of vehicles or engines, and can be used to provide benefits in industrial, commercial, and residential applications. Further non-limiting examples of other vehicles or engines to which the disclosure can relate can include boats, helicopters, cars, or other aquatic, air, space, or land vehicles. Industrial, commercial, or residential applications of the disclosure can include, but are not limited to, marine power plants, wind turbines, or small power plants.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an example, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
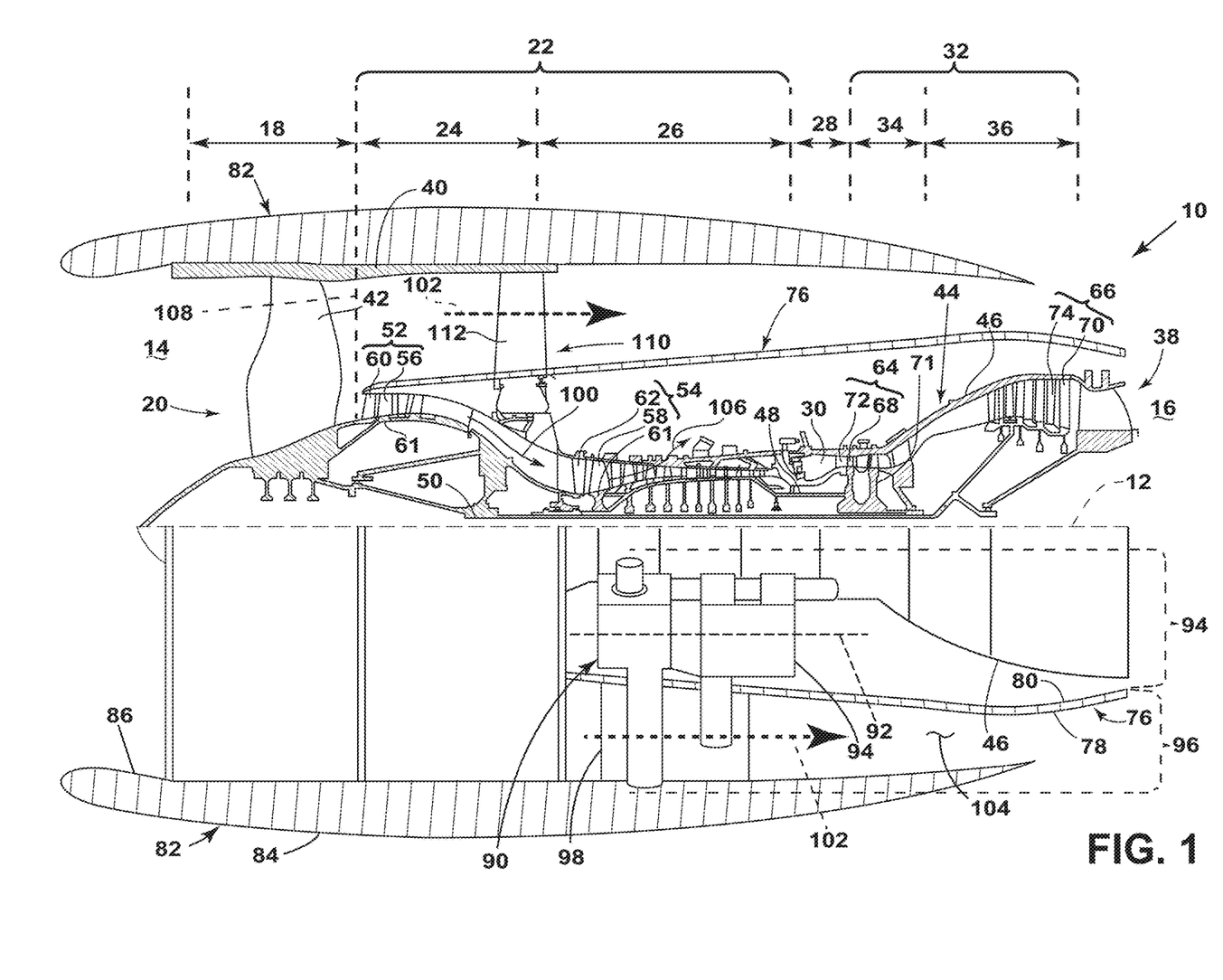
FIG. 1 is a schematic view of a turbine engine with a partial sectional cutaway along a turbine engine axis of rotation illustrating engine static structures and an accessory gearbox in the lower half, according to aspects of the present disclosure.

FIG. 1 is a schematic partial section view of a turbine engine 10 for an aircraft, where an upper section of FIG. 1 illustrates the cross section of the turbine engine 10 and a lower section illustrates a schematic of static support structures and an accessory gearbox.

The turbine engine 10 has a centerline or a longitudinal axis illustrated as a turbine engine axis of rotation 12 extending forward 14 to aft 16. The turbine engine 10 includes, in downstream serial flow relationship, a fan section 18 including a fan assembly 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan assembly 20. The fan assembly 20 includes a plurality of fan blades 42 disposed radially about the turbine engine axis of rotation 12. The HP compressor 26, the combustor 30, and the HP turbine 34 form an engine core 44, which generates combustion gases. The engine core 44 is surrounded by core casing 46, which can be coupled with the fan casing 40.

A HP shaft or HP spool 48 disposed coaxially about the turbine engine axis of rotation 12 of the turbine engine 10 drivingly connects the HP turbine 34 to the HP compressor 26. A LP shaft or LP spool 50, which is disposed coaxially about the turbine engine axis of rotation 12 of the turbine engine 10 within the larger diameter annular HP spool 48, drivingly connects the LP turbine 36 to the LP compressor 24 and fan assembly 20. The HP spool 48 and LP spool 50 are rotatable about the engine centerline and couple to a plurality of rotatable elements, which can collectively define an inner rotor/stator. While illustrated as a rotor, it is contemplated that the inner rotor/stator can be a stator.

The LP compressor 24 and the HP compressor 26 respectively include a plurality of compressor stages 52, 54, in which a set of compressor blades 56, 58 rotate relative to a corresponding set of static compressor vanes 60, 62, which can also be called a nozzle, to compress or pressurize the stream of fluid passing through the stage. In a single compressor stage 52, 54, multiple compressor blades 56, 58 can be provided in a ring and can extend radially outwardly relative to the turbine engine axis of rotation 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP spool 48 and LP spool 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, which can also be called a nozzle, to extract energy from the stream of fluid passing through the stage. In a single turbine stage 64, 66, multiple turbine blades 68, 70 can be provided in a ring and can extend radially outwardly relative to the turbine engine axis of rotation 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP spool 48 and LP spool, 50, with each stage having a dedicated disk 71. The vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor section 22 and turbine section 32 are also referred to individually or collectively as an outer rotor/stator. As illustrated, the outer rotor/stator can refer to the combination of non-rotating elements throughout the turbine engine 10. Alternatively, the outer rotor/stator that circumscribes at least a portion of the inner rotor/stator, can be designed to rotate. The inner or outer rotor/stator can include at least one component that can be, by way of non-limiting example, a shroud, vane, nozzle, nozzle body, combustor, hanger, or blade, where the at least one component is a plurality of circumferentially arranged component segments having confronting pairs of circumferential ends.

An inner cowl 76 is radially spaced from the engine core 44 and can circumscribe at least a portion of the engine core 44. The inner cowl 76 can include an outside face 78 and an inside face 80, where the inside face 80 of the inner cowl 76 can confront the engine core 44 or the core casing 46.

A nacelle or outer cowl 82 is radially spaced from the inner cowl 76 and can circumscribe at least a portion of the inner cowl 76. The outer cowl 82 has a radially outer surface 84 and a radial inner surface 86, where the radial inner surface 86 confronts the outside face 78 of the inner cowl 76. The outer cowl 82 can support or define the fan casing 40.

An accessory gearbox (AGB) 90 can be provided with the engine core 44 or the core casing 46 and be at least partially confined within the inner cowl 76. It is contemplated that the AGB 90 is mounted or operably coupled to the engine core 44 with a hinge mount. That is, when one or more clasps or fasteners is removed, the AGB 90 can swing away from at least part of the engine core 44 or core casing 46 to which a remainder of the AGB 90 remains operably coupled to. The AGB 90 is operably coupled to the engine core 44 or core casing 46 in a location and orientation so as to provide easy access to the AGB 90 and other component such as, but not limited to, fuel lines, electrical cables, electrical connectors, oil tubes, sight glasses, and fill ports.

An accessory gearbox axis 92 can be defined by the AGB 90. In the illustrated example, the accessory gearbox axis 92 is parallel to the turbine engine axis of rotation 12 when the AGB 90 is fully installed and in use within the turbine engine 10. It is contemplated, however, that the accessory gearbox axis 92 and the turbine engine axis of rotation 12 can be at any suitable angle and need not be parallel.

The AGB 90 includes a first portion 94 and a second portion 96. The first portion 94 is located within the inner cowl 76. That is, the first portion 94 is located between the inside face 80 of the inner cowl 76 and the engine core 44 or the core casing 46. The first portion 94 of the AGB 90 can straddle the engine core 44 or the core casing 46.

The second portion 96 of the AGB 90 is located between the inner cowl 76 and the outer cowl 82. That is, the second portion 96 of the AGB 90 is located between the radial inner surface 86 of the outer cowl 82 and the outside face 78 of the inner cowl 76. However, it is contemplated that a part of the second portion 96 of the AGB 90 can extend past the radial inner surface 86 of the outer cowl 82. That is, the second portion 96 of the AGB 90 can operably couple to one or more components located in the outer cowl 82.

At least one strut 98 can extend radially from the inner cowl 76 to the outer cowl 82. The strut 98 can operably couple the inner cowl 76 and the outer cowl 82. It is contemplated that at least a part of the second portion 96 of the AGB 90 is located in the strut 98.

The second portion 96 of the AGB 90 is illustrated as being perpendicular to the accessory gearbox axis 92. However, this need not be the case and it is further contemplated that the second portion 96 and the accessory gearbox axis 92 can be at any relative angle.

In operation, airflows through the fan section 18 to an inlet 108 that is defined by the fan assembly 20. Airflow exiting the fan section 18 through the inlet 108 enters a bifurcated airflow path. The bifurcated airflow path includes a pressurized airflow illustrated as a first portion or a first airflow 100 through the engine core 44 and second portion 96 or second airflow 102 that passes through a secondary airflow path 104. Therefore, the inlet 108 can be fluidly coupled to the engine core 44 and the secondary airflow path 104.

The first airflow 100 is channeled into the LP compressor 24, which then supplies pressurized airflow 100 to the HP compressor 26, which further pressurizes the air. The pressurized airflow 100 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan assembly 20 and the LP compressor 24.

A portion of the pressurized airflow 100 can be drawn from the compressor section 22 as bleed air 106. The bleed air 106 can be drawn from the pressurized airflow 100 and provided to engine components requiring cooling. The temperature of pressurized airflow 100 entering the combustor 30 is significantly increased. As such, cooling provided by the bleed air 106 is necessary for operating of such engine components in the heightened temperature environments.

The second airflow 102 travels through the secondary airflow path 104 defined by the inner cowl 76 and the outer cowl 82. That is, the outside face 78 of the inner cowl 76 and the radial inner surface 86 of the outer cowl 82 can define the secondary airflow path 104.

The second airflow 102 bypasses the LP compressor 24 and the engine core 44 and exits the turbine engine 10. The secondary airflow path 104 can include a stationary vane row, and more particularly an outlet guide vane assembly 110, that includes a plurality of airfoil guide vanes 112. More specifically, a circumferential row of radially extending airfoil guide vanes 112 are utilized adjacent the fan section 18 to exert some directional control of the second airflow 102.

Some of the air supplied by the fan assembly 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
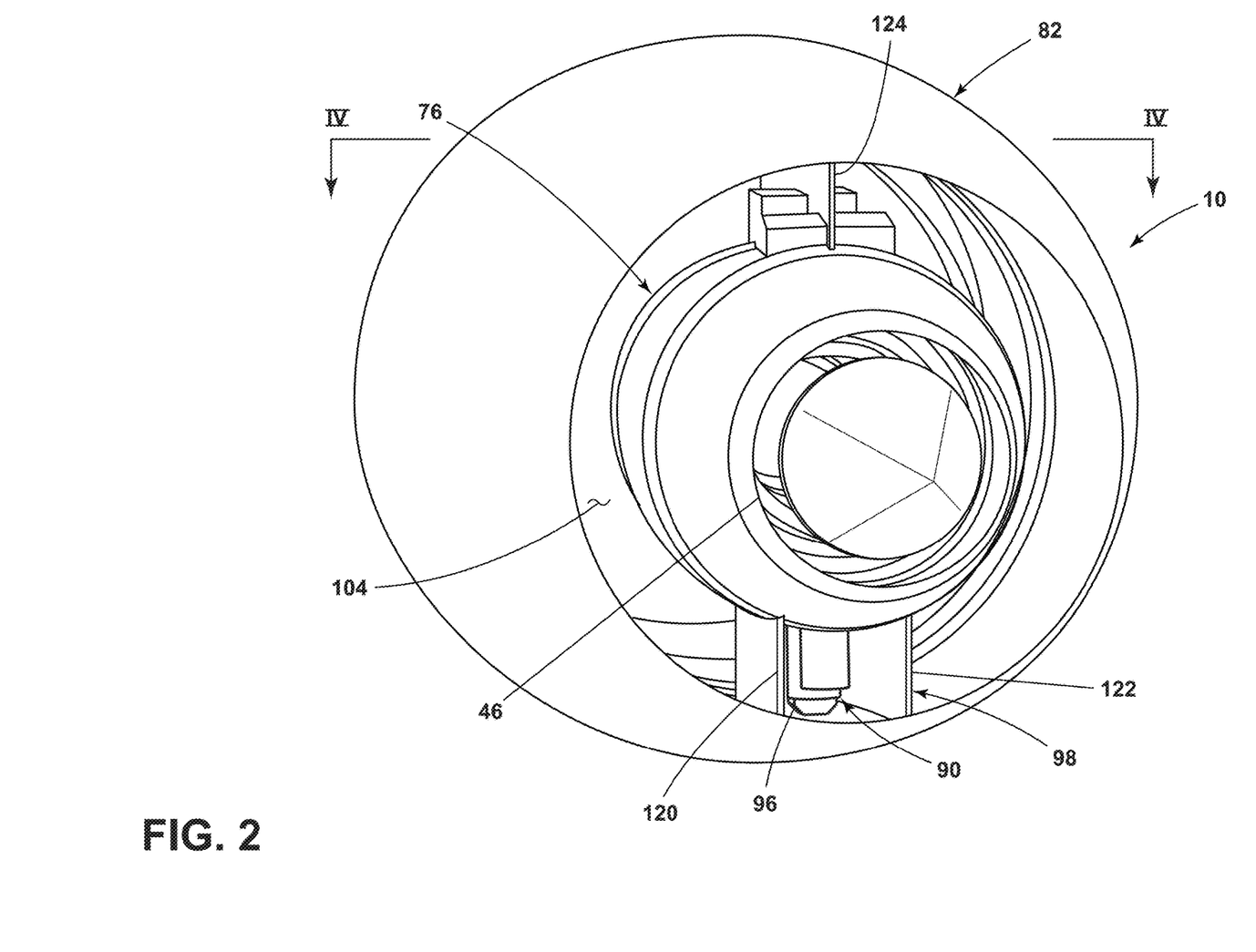
FIG. 2 is a rear perspective view of selected components of the turbine engine of FIG. 1, according to aspects of the present disclosure.

FIG. 2 further illustrates static support structures of the turbine engine 10 and the location of the second portion 96 of the AGB 90 with respect thereto. For clarity, FIG. 2 only includes the outer cowl 82, the inner cowl 76, the core casing 46, support struts including the strut 98, and the second portion 96 of the AGB 90. The strut 98 that extends through the secondary airflow path 104 includes a first wall 120 and a second wall 122 spaced from the first wall 120, although any number of walls is contemplated. While illustrated as open, it is contemplated that the first wall 120 and second wall 122 can be coupled or otherwise connected aft of the second portion 96 of the AGB 90. It is further contemplated that the first wall 120 and the second wall 122 can join at a point forward of the second portion 96 of the AGB 90. It will be understood that the strut 98 can form an aerodynamic housing for at least part of the second portion 96.

An upper strut 124 is illustrated as having a single wall. However, it is contemplated that the upper strut 124 can be reconfigured to house or partially surround the second portion 96 of the AGB 90. It will be understood that the second portion 96 of the AGB 90 can be located in any part of the secondary airflow path 104. This includes but is not limited to within a strut located anywhere about the turbine engine 10. The second portion 96 can extend from the inner cowl 76 to any suitable radial location including into the outer cowl 82 or radially outward from the secondary airflow path 104.

Figure 3:
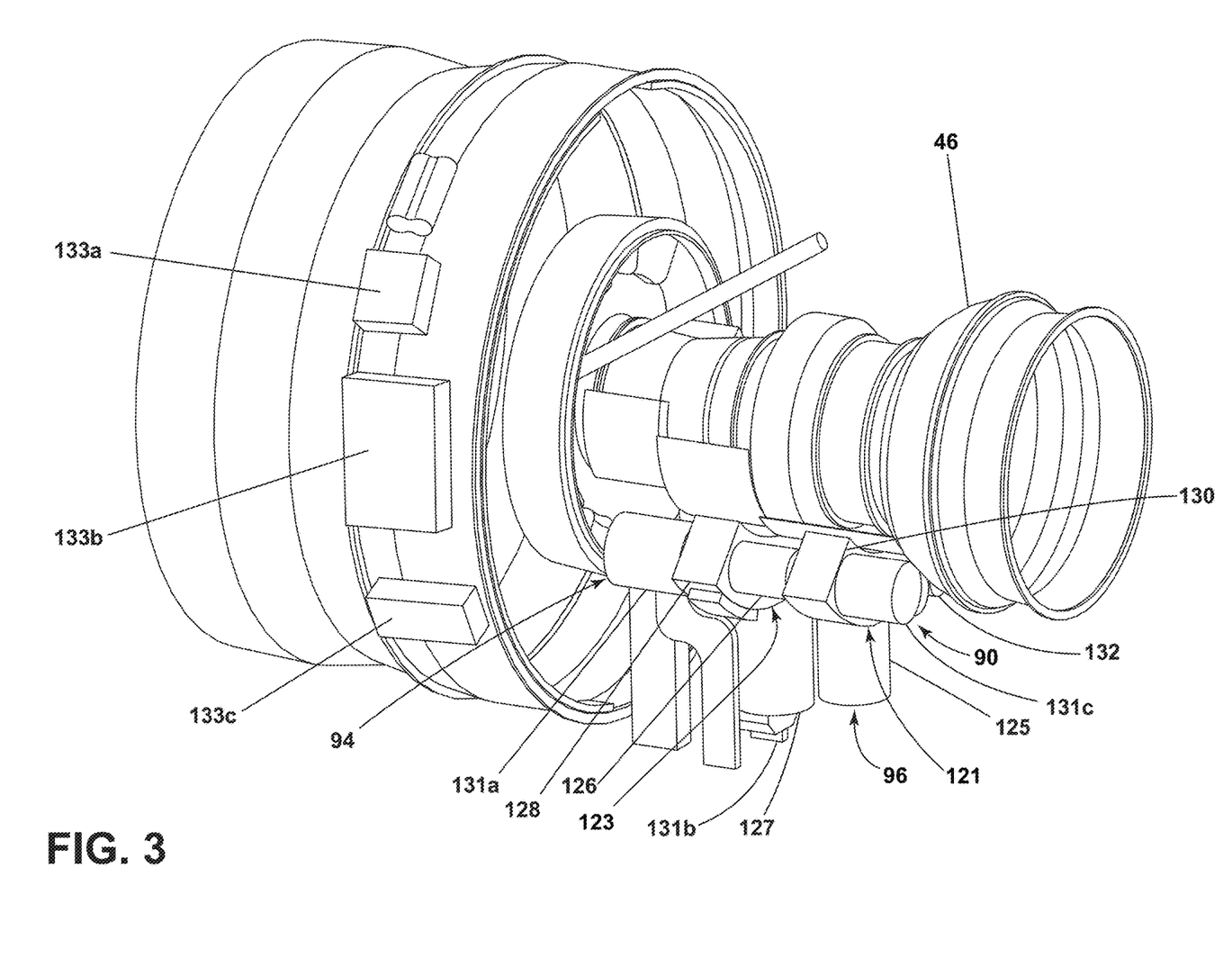
FIG. 3 is a side perspective view of the selected components of the turbine engine of FIG. 1, further illustrating the accessory gearbox according to aspects of the present disclosure.

FIG. 3 further illustrates the AGB 90 provided with the engine core 44. The outer cowl 82, inner cowl 76, and internal portions of the engine core 44 have not been illustrated for clarity. A set of forks illustrated as a first fork 121 and a second fork 123 can be included in the AGB 90. As used herein, the term "fork" is a Y-shaped object having an upright or base from which two arms branch off in different directions.

In the illustrated example, the first fork 121 includes a first base portion 125 defined by a part of the second portion 96 of the AGB 90. A first arm 130 and a second arm 132 extend from the first base portion 125. The first arm 130 and the second arm 132 are part of the first portion 94 of the AGB 90 that can straddle the engine core 44 or core casing 46. That is, the as the base portion 125 extends, forks, splits, branches, or otherwise couples to the first arm 130 and the second arm 132, where the first arm 130 and the second arm 132 form a V-shape, U-shape, or the like, in order to cradle, straddle, or otherwise partially circumscribe the engine core 44 or core casing 46.

Similarly, the second fork 123 can be defined by a second base portion 127 that forks, splits, or otherwise couples to a first arm 128 and a second arm (not shown as it wraps behind the core casing 46) that straddle the engine core 44 or core casing 46. It is contemplated that any number of one or more forks can be included in the AGB 90.

The first fork 121 and the second fork 123 are illustrated as being spaced along the accessory gearbox axis 92. The first fork 121 and the second fork 123 can be coupled via one or more of a drive shaft, gearbox, hydraulic drive, or the like. The drive shaft or a hydraulic drive can include one or more casings 126 positioned between the first fork 121 and the second fork 123. It is contemplated that only a single fork can be included or that additional sections, casing, drive shafts, or the like, can be included to increase the number of interfaces or forks.

The AGB 90 can couple to any number of interfaces, illustrated, by way of non-limiting example as interfaces 131a, 131b, 131c. Additionally, it is contemplated that the AGB 90 can couple to any number of components or systems illustrated, by way of non-limiting example as systems 133a, 133b, 133c. Systems powered by the AGB 90 can be located at axially or radially spaced locations relative to the AGB 90. By way of example, systems or interfaces can include, but are not limited to, any one or more of an output shaft, fuel pump, transfer gearbox, lubrication pump, air compressor, scavenge pump, electrical generator, fuel control, fuel pump, permanent magnet alternator, lubrication pump, or hydraulic pump.

Figure 4:
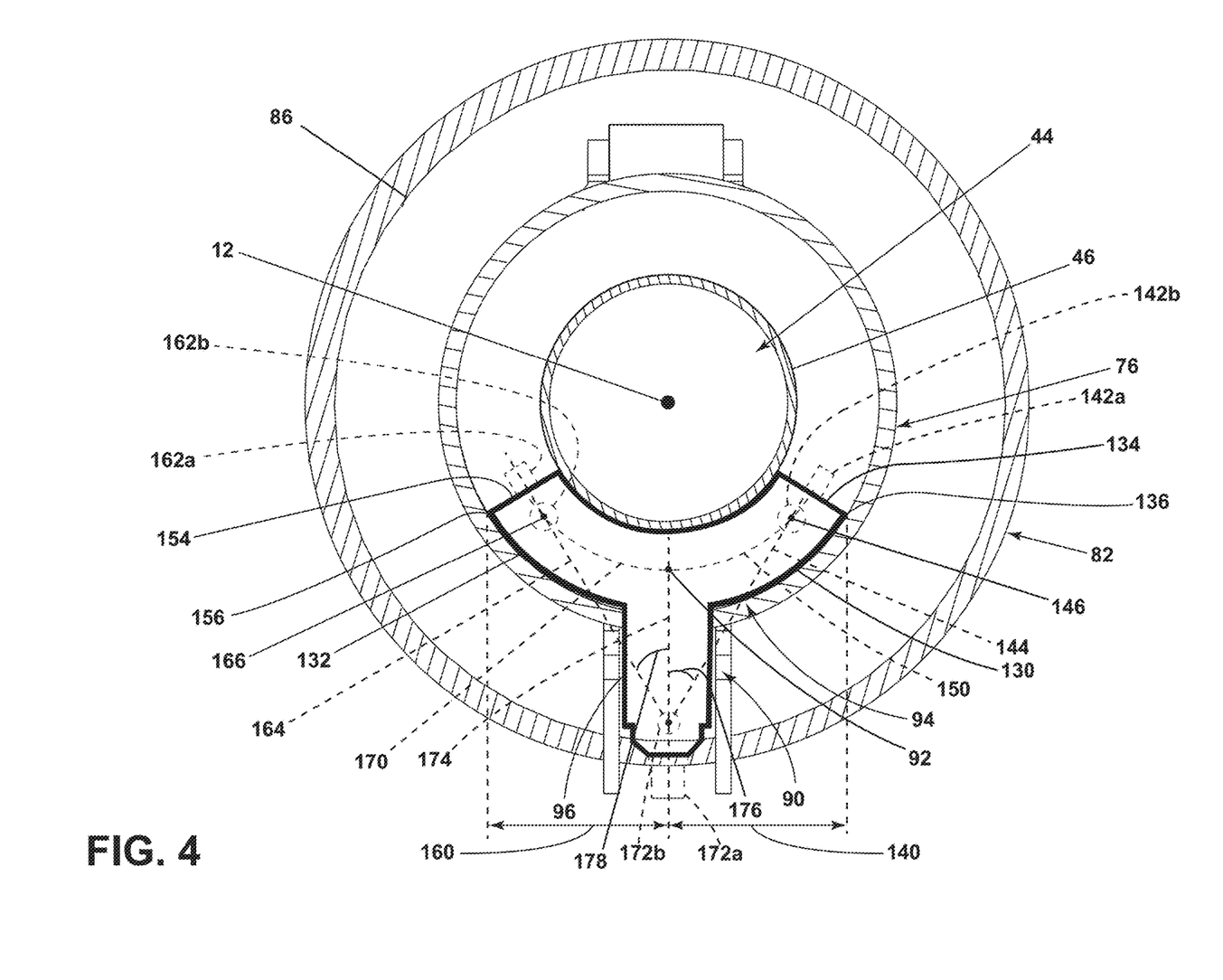
FIG. 4 illustrates a schematic cross section of the accessory gearbox of FIG. 2 in the context of selected support structures, according to aspects of the present disclosure.

FIG. 4 is a cross section further illustrating the AGB 90, the cross section is a schematic cross section generally taken at the axial location of the first fork 121 further illustrated as a cross section line in FIG. 2. The engine core 44 and core casing 46 are schematically illustrated along with the turbine engine axis of rotation 12. A C-shaped or arc cross-section can be defined by the first arm 130 and the second arm 132 and straddle the engine core 44. While no spacing or coupling components are illustrated between the core casing 46 and the AGB 90 it will be understood that any suitable spacing and components can be included. The first arm 130 extends from the accessory gearbox axis 92 to a first terminating point or first distal surface 134. The first distal surface 134 can have a first end point 136 defined as the point on the first distal surface 134 that is radially farthest from the turbine engine axis of rotation 12. A first distance 140 can be measured radially from the accessory gearbox axis 92 to the first end point 136.

The first arm 130 can include a first plane 144. The two dimensions defining the first plane 144 are illustrated by way of example as a first dimension that is generally perpendicular to the first distal surface 134 and a second dimension is into/out of the page. As used herein, the term "generally perpendicular" defines an angle between two objects that is between 80 degrees and 100 degrees. Additionally, or alternatively, the plane 144 can be defined by a plane defined by at least an obtuse angle extending from the yaw or pitch axis (i.e. from into/out of page, or top to bottom respectively in FIG. 1). In FIG. 4 example the obtuse is formed with yaw-roll plane. In other examples the plane 144 can be defined by rotation around more than one of these three mutually orthogonal axes. It is further contemplated that the first plane 144 can form any angle in either dimension with the first distal surface 134.

A primary set of interfaces 142a, 142b can be operably coupled to or defined by a portion of the first arm 130. The primary set of interfaces 142a, 142b can extend along or be defined by the first plane 144. While illustrated as two interfaces 142a, 142b that lie on the plane 144, any number of interfaces in the first plane 144, including one, are contemplated.

The first arm 130 can define a first arm axis of rotation 146. It is contemplated that the rotation of an output shaft or other portion of the first arm 130 about the first arm axis of rotation 146 can be considered an interface of the AGB 90. An interface as defined herein can be an input to the AGB 90 or an output from the AGB 90. It is further contemplated that the first arm 130 can define any number of axes of rotations.

The first arm 130 can sweep a first arclength 150 from the accessory gearbox axis 92 to the first distal surface 134. The first arm 130 can cover, straddle, or otherwise wrap around between 5% and 50% of the engine core 44 or the core casing 46. It is contemplated that the length of the first arclength 150 is between 1% and 60% the circumference of the engine core 44 or the core casing 46.

The second arm 132 extends from the plane of the accessory gearbox axis 92 to a second terminating point or second distal surface 154. The second distal surface 154 can have a second end point 156 defined as the point on the second distal surface 154 that is radially farthest from the turbine engine axis of rotation 12. A second distance 160 can be measured radially from the accessory gearbox axis 92 to the second end point 156. While illustrated as equal, the first distance 140 can be greater than or less than the second distance 160. That is, the second portion 96 of the AGB 90 is spaced non-equidistant between the first end point 136 and the second end point 156, where the first end point 136 and the second end point 156 are defined by the arc cross-section.

The second arm 132 can include a second plane 164. The two dimensions defining the second plane 164 are illustrated by way of example as a first dimension that is generally perpendicular to the second distal surface 154 and a second dimension is into/out of the page. Similar to the first plane 144, the second plane 164 can be defined by a plane defined by at least an obtuse angle extending from the yaw or pitch axis (i.e. from into/out of page, or top to bottom respectively in FIG. 1). It is further contemplated that the second plane 164 can form any angle in either dimension with the second distal surface 154.

A secondary set of interfaces 162a, 162b can be operably coupled to or defined by a portion of the second arm 132. The secondary set of interfaces 162a, 162b can be defined by the second plane 164. While illustrated as two interfaces 162a, 162b that lie on or extend along the plane 164, any number of interfaces in the second plane 164, including one, are contemplated.

The second arm 132 can define a second arm axis of rotation 166. It is contemplated that the rotation of an output shaft or other portion of the second arm 132 about the second arm axis of rotation 166 can be considered an interface of the AGB 90. It is further contemplated that the second arm 132 can define any number of axes of rotations.

The second arm 132 can sweep a second arclength 170 from the accessory gearbox axis 92 to the second distal surface 154. The second arm 132 can cover or otherwise wrap around between 5% and 50% of the engine core 44 or the core casing 46. It is contemplated that the length of the second arclength 170 is between 1% and 60% of the circumference of the engine core 44 or the core casing 46. While illustrated as equal, the second arclength 170 can be less than or greater than the first arclength 150.

A third plane 174 can define a tertiary set of interfaces 172a, 172b included in the second portion 96 of the AGB 90. As illustrated, by way of non-limiting example, the second portion 96 of the AGB 90 can be generally perpendicular to the accessory gearbox axis 92. The tertiary set of interfaces 172a, 172b can extend along the third plane 174. It is contemplated that one or more of the tertiary set of interfaces 172a, 172b extends past the radial inner surface 86 of the outer cowl 82. That is, the AGB 90 can include the primary set of interfaces 142a, 142b defined by the first plane 144, the secondary set of interfaces 162a, 162b defined by the second plane 164, and the tertiary set of interfaces 172a, 172b defined by the third plane 174. Interfaces can include, but are not limited to systems, components, or other engine elements that receive energy from the rotation of the AGB 90 about the accessory gearbox axis 92. It is contemplated that the interfaces 172a, 172b, 142a, 142b, 162a and 162b can correspond to an interface to service one or more of, or any of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 96 of the AGB 90 can define any number of axes of rotations.

The third plane 174, similar to the first plane 144 and the second plane 164, includes two dimensions illustrated by way of example as a first dimension that is generally perpendicular to the accessory gearbox axis 92, extending radially outward from the longitudinal axis 12, and a second dimension is into/out of the page. Similar to the first plane 144 and the second plane 164, the third plane 174 can be defined by a plane defined by at least an obtuse angle extending from the yaw or pitch axis (i.e. from into/out of page, or top to bottom respectively in FIG. 1). It is further contemplated that the second plane 174 can form any angle in either dimension with the accessory gearbox axis 92.

As shown, by way of example, each of the respective pair of interfaces 142a, 142b, 162a and 162b, 172a, 172b or axes of rotations 146, 166 associated with the respective planes 144, 164, 174 are generally perpendicular to each other. However, it is contemplated that the angles between the interfaces 142a, 142b, 162a and 162b, 172a, 172b or the axes of rotations 146, 166 associated with the respective planes 144, 164, 174 can be any angle, including between 50 degrees to 100 degrees.

A first angle 176 can be defined from the third plane 174 to the first plane 144 by a clockwise rotation. As illustrated, the first angle 176 can be an acute angle, however any angle between, but not including, zero degrees and 180 degrees is contemplated. A second angle 178 can be from the third plane 174 to the second plane 164 by a counterclockwise rotation. As illustrated, the first angle 176 can be an acute angle, however any angle between, but not including, zero degrees and 180 degrees is contemplated. While illustrated as equal, it is contemplated that the first angle 176 can be greater than or less than the second angle 178.

It is contemplated that any number of additional planes defining interfaces or axes of rotation can extend from or be defined by the first portion 94 or the second portion 96. It is also contemplated that the additional planes of interfaces or axes of rotation can extend from or be defined by one or more portions of the first plane 144, second plane 164, the third plane 174, the first arm axis of rotation 146, the second arm axis of rotation 166, the accessory gearbox axis 92, the first arclength 150, or the second arclength 170.

In operation, the AGB 90 is operably coupled to one or more components of the engine core 44. That is, one or more components of the engine core 44 provides or otherwise communicates energy to the AGB 90. By way of non-limiting example, the AGB 90 can be powered by energy provided by a drive shaft located in the engine core 44 along the turbine engine axis of rotation 12 or the LP spool 50. Additionally, or alternatively, the AGB 90 can be electrically driven using electrical power generated by the rotation of the engine core 44 or a storage device for electrical energy.

The AGB 90, when powered, rotates one or more components about the accessory gearbox axis 92. The rotation about the accessory gearbox axis 92 can then provide energy in the form of rotational energy or electro-magnetic energy to at least one of interfaces from the first set of interfaces 142a, 142b, the secondary set of interfaces 162a, 162b, or the tertiary set of interfaces 172a, 172b. The first set of interfaces 142a, 142b, the secondary set of interfaces 162a, 162b, and the tertiary set of interfaces 172a, 172b are located in the first plane 144, the second plane 164, and the third plane 174, respectively. The first plane 144, the second plane 164, and the third plane 174 are three distinct planes that can be parallel or intersect.

The transfer of energy from the AGB 90 to the first set of interfaces 142a, 142b, the secondary set of interfaces 162a, 162b, and the tertiary set of interfaces 172a, 172b can be from the rotation of a bevel gear arrangement. That is, one or more of the first set of interfaces 142a, 142b, the secondary set of interfaces 162a, 162b, or the tertiary set of interfaces 172a, 172b can be driven using a system of bevel gears having a shared drive shaft. It is further contemplated that the AGB 90 can include multiple motors to provide power to hydraulic or electrically driven interfaces.

The tertiary set of interfaces 172a, 172b coupled to or defined by the second portion 96 of the AGB 90 allow the first portion 94 of the AGB 90 to be smaller. That is, having the second portion 96 of the AGB 90 allows the distance between the inner cowl 76 and the engine core 44 or core casing 46 to decrease. The smaller distance between the inner cowl 76 and the engine core 44 or core casing 46 can increase the aerodynamics of the secondary airflow path 104 by decreasing drag on the second airflow 102. Additionally, or alternatively, the smaller first portion 94 of the AGB 90 can provide room for additional components, such as, but not limited to, reverse thruster components.

The AGB 90 as disclosed can be used for smaller applications, such as, but not limited to, regional aircrafts. The AGB 90 having the first portion 94 between the core casing 46 and the inner cowl 76 and the second portion 96 between the inner cowl 76 and the outer cowl 82 allows for the engine 10 to include, for example, a slim line nacelle fan cowl and/or advanced thrust reversers.

Figure 5:
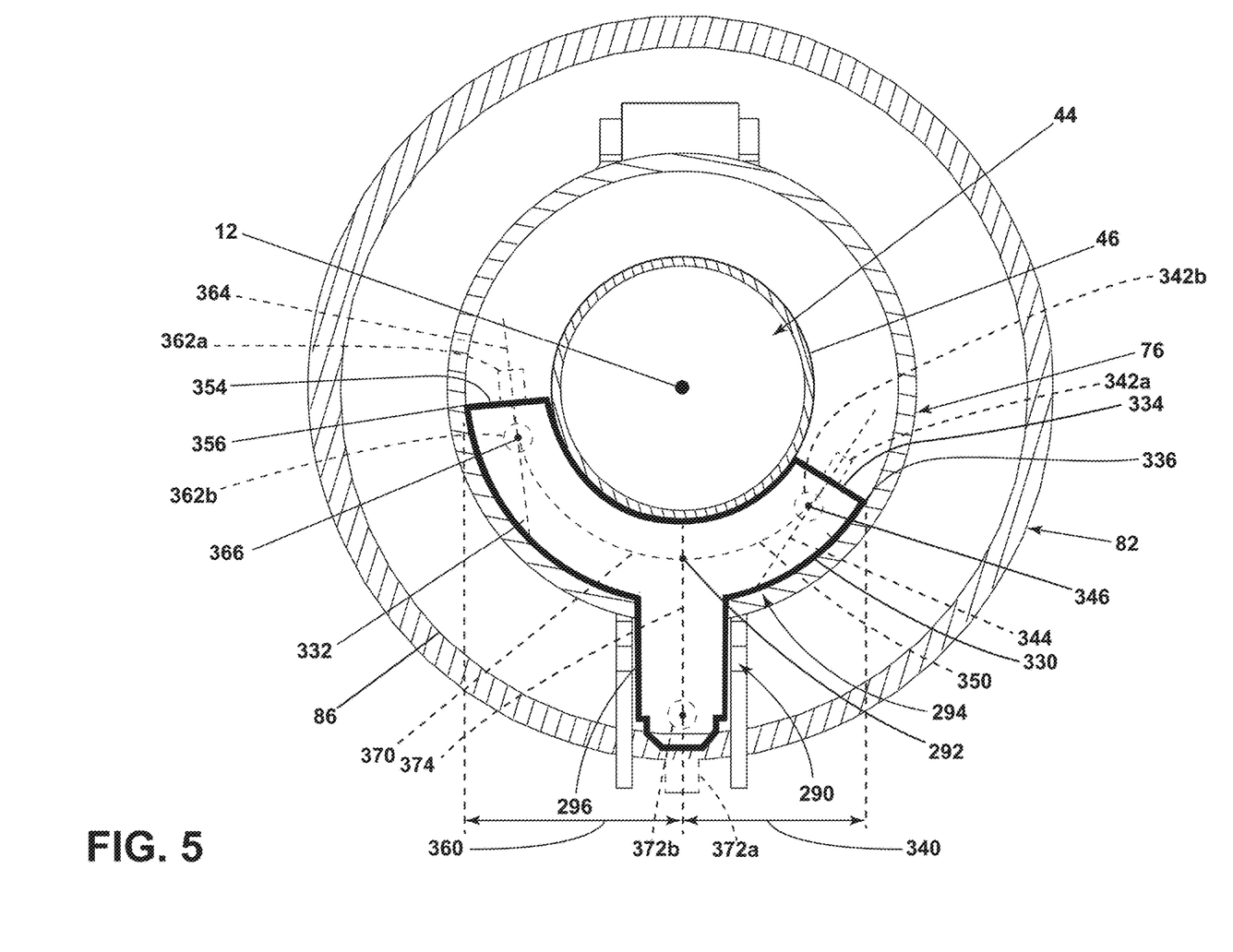
FIG. 5 illustrates a schematic cross section of an alternative accessory gear box that can be utilized in the turbine engine of FIG. 1.

FIG. 5 illustrates an AGB 290, the AGB 290 is similar to the AGB 90 previously described. Therefore, like parts will be identified with like numerals increased by 200, and it is understood that the description of like parts of the AGB 90 applies to the AGB 290, unless otherwise noted. As with FIG. 4 it will be understood that FIG. 5 schematically illustrates the engine core 44 and core casing 46 along with the turbine engine axis of rotation 12 and that while no spacing or coupling components are illustrated between the core casing 46 and the AGB 290 it will be understood that any suitable spacing and components can be included.

A C-shaped or arc cross-section can be defined by a first arm 330 and a second arm 332. However, unlike the previously described AGB 90, the first arm 330 and the second arm 332 of the AGB 290 are not equidistant in length. The first arm 330 extends from an accessory gearbox axis 292 to a first terminating point or first distal surface 334. The first distal surface 334 can have a first end point 336 defined as the point on the first distal surface 334 that is radially farthest from the turbine engine axis of rotation 12. A first distance 340 can be measured radially from the accessory gearbox axis 292 to the first end point 336.

The first arm 330 can include a first plane 344. The two dimensions defining the first plane 344 are illustrated by way of example as a first dimension that is generally perpendicular to the first distal surface 334 and a second dimension is into/out of the page. Additionally, or alternatively, the plane 344 can be defined by a plane defined by at least an obtuse angle extending from the yaw or pitch axis (i.e. from into/out of page, or top to bottom respectively in FIG. 1). In FIG. 5 example the obtuse is formed with yaw-roll plane. In other examples the plane 344 can be defined by rotation around more than one of these three mutually orthogonal axes. It is further contemplated that the first plane 344 can form any angle in either dimension with the first distal surface 334.

A primary set of interfaces 342a, 342b can be operably coupled to or defined by a portion of the first arm 330. The primary set of interfaces 342a, 342b can extend along or be defined by the first plane 344. While illustrated as two interfaces 342a, 342b that lie on the plane 344, any number of interfaces in the first plane 344, including one, are contemplated.

The first arm 330 can define a first arm axis of rotation 346. It is contemplated that the rotation of an output shaft or other portion of the first arm 330 about the first arm axis of rotation 346 can be considered an interface. It is further contemplated that the first arm 330 can define any number of axes of rotations.

The first arm 330 can sweep a first arclength 350 from the accessory gearbox axis 292 to the first distal surface 334. The first arm 330 can cover or otherwise wrap around between 5% and 50% of the engine core 44 or core casing 46. It is contemplated that the length of the first arclength 350 is between 1% and 60% the circumference of the engine core 44 or core casing 46.

The second arm 332 extends from the plane of the accessory gearbox axis 292 to a second terminating point or second distal surface 354. The second distal surface 354 can have a second end point 356 defined as the point on the second distal surface 354 that is radially farthest from the turbine engine axis of rotation 12. A second distance 360 can be measured radially from the accessory gearbox axis 292 to the second end point 356. While illustrated as greater than the first distance 340, the second distance 360 can be less than or equal to the first distance 340. That is, the second portion 96 of the AGB 290 is spaced non-equidistant between the first end point 336 and the second end point 356, where the first end point 336 and the second end point 356 are defined by the arc cross-section.

The second arm 332 can include a second plane 364. The two dimensions defining the second plane 364 are illustrated by way of example as a first dimension that is generally perpendicular to the second distal surface 354 and a second dimension is into/out of the page. Similar to the first plane 344, the second plane 364 can be defined by a plane defined by at least an obtuse angle extending from the yaw or pitch axis (i.e. from into/out of page, or top to bottom respectively in FIG. 1). It is further contemplated that the second plane 364 can form any angle in either dimension with the second distal surface 354.

A secondary set of interfaces 362a, 362b can be operably coupled to or defined by a portion of the second arm 332. The secondary set of interfaces 362a, 362b can be defined by the second plane 164. While illustrated as two interfaces 162a, 162b that lie on the plane 164, any number of interfaces in the second plane 164, including one, are contemplated.

The second arm 332 can define a second arm axis of rotation 366. It is contemplated that the rotation of an output shaft or other portion of the second arm 332 about the second arm axis of rotation 366 can be considered an interface. It is further contemplated that the second arm 332 can define any number of axes of rotations.

The second arm 332 can sweep a second arclength 370 from the accessory gearbox axis 292 to the second distal surface 354. The second arm 332 can cover or otherwise wrap around between 5% and 50% of the engine core 44 or the core casing 46. It is contemplated that the length of the second arclength 370 is between 1% and 60% the circumference of the engine core 44 or the core casing 46. While illustrated as greater, the second arclength 370 can be less than or equal to the first arclength 350.

A third plane 174 can define a tertiary set of interfaces 372a, 372b that can be included in a second portion 296 of the AGB 290. As illustrated, by way of non-limiting example, the second portion 296 of the AGB 290 can be generally perpendicular to the accessory gearbox axis 292. The tertiary set of interfaces 372a, 372b can extend along the third plane 374. It is contemplated that one or more of the tertiary set of interfaces 372a, 372b extends past the radial inner surface 86 of the outer cowl 82. That is, the AGB 90 can include the primary set of interfaces 342a, 342b defined by the first plane 344, the secondary set of interfaces 362a, 362b defined by the second plane 364, and the tertiary set of interfaces 372a, 372b defined by the third plane 374. Interfaces can include, but are not limited to systems, components, or other engine elements that receive energy from the rotation of the AGB 290 about the accessory gearbox axis 292. It is contemplated that the interfaces can include, but are not limited to any one or more of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 296 of the AGB 290 can define any number of axes of rotations.

The third plane 374, similar to the first plane 344 and the second plane 364, includes two dimensions illustrated by way of example as a first dimension that is generally perpendicular to the accessory gearbox axis 292, extending radially outward from the longitudinal axis 12, and a second dimension is into/out of the page. Similar to the first plane 344 and the second plane 364, the third plane 374 can be defined by a plane defined by at least an obtuse angle extending from the yaw or pitch axis (i.e. from into/out of page, or top to bottom respectively in FIG. 1). It is further contemplated that the second plane 374 can form any angle in either dimension with the accessory gearbox axis 292.

As shown, by way of example, each of the respective pair of interfaces 342a, 342b, 362a and 362b, 372a, 372b or axes of rotations 346, 366 associated with the respective planes 344, 364, 374 are generally perpendicular to each other. However, it is contemplated that the angles between the interfaces 342a, 342b, 362a and 362b, 372a, 372b or the axes of rotations 346, 366 associated with the respective planes 344, 364, 374 can be any angle, including between 50 degrees to 100 degrees.

It is contemplated that any number of additional planes defining interfaces or axes of rotation can extend from or be defined by a first portion 294 or the second portion 296. It is also contemplated that the additional planes defining interfaces or axes of rotation can extend from or be defined by one or more portions of the first plane 344, second plane 364, the third plane 374, the first arm axis of rotation 346, the second arm axis of rotation 366, the accessory gearbox axis 292, the first arclength 350, or the second arclength 370.

Figure 6:
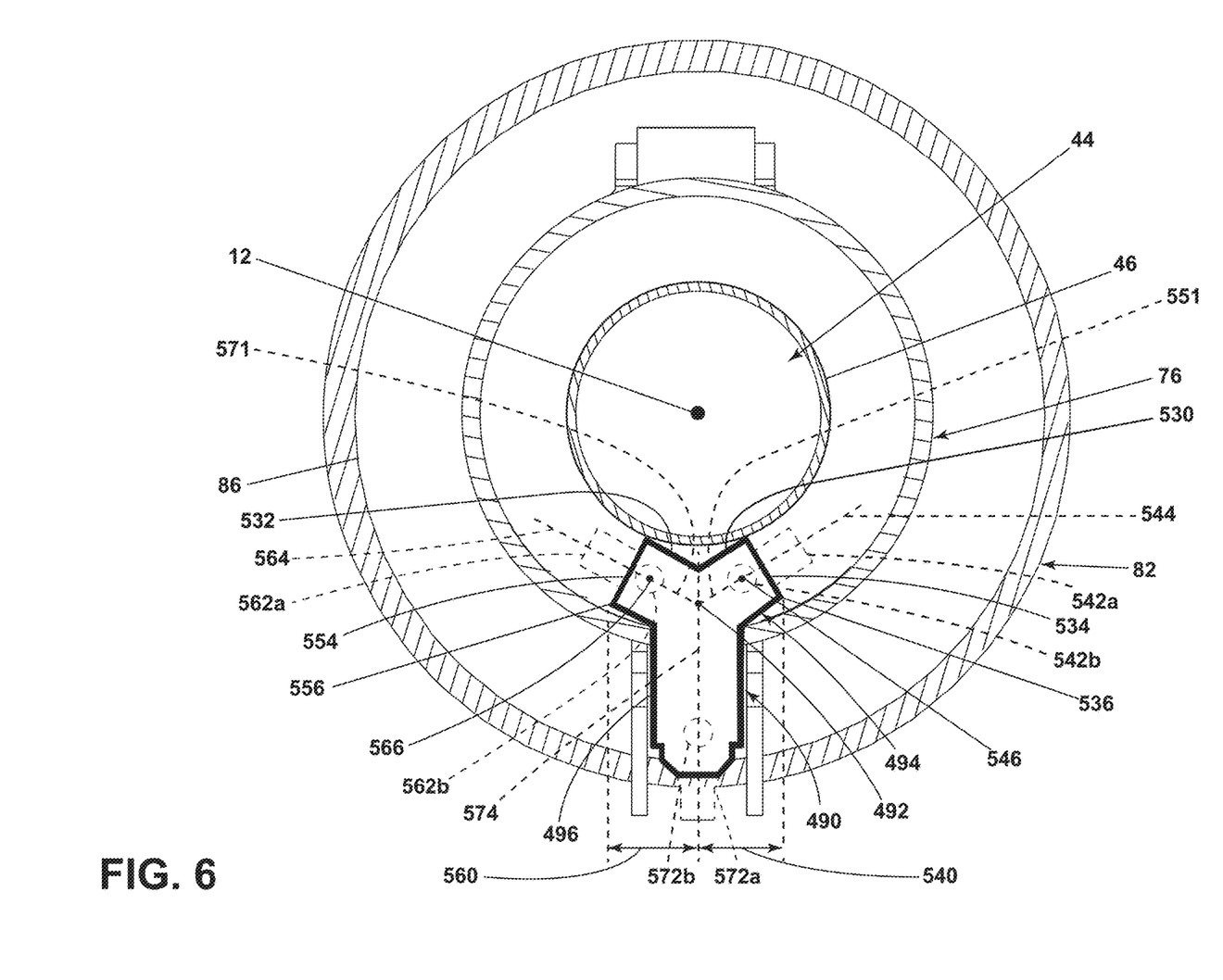
FIG. 6 illustrates a schematic cross section of an alternative accessory gear box that can be utilized in the turbine engine of FIG. 1.

FIG. 6 illustrates an AGB 490 that is similar to the AGB 90 and the AGB 290 previously described. Therefore, like parts will be identified with like numerals further increased by 200, and it is understood that the description of like parts of the AGB 90 and AGB 290 applies to the AGB 490, unless otherwise noted. As with FIG. 4 it will be understood that FIG. 6 schematically illustrates the engine core 44 and core casing 46 along with the turbine engine axis of rotation 12 and that while no spacing or coupling components are illustrated between the core casing 46 and the AGB 490 it will be understood that any suitable spacing and components can be included.

One difference is that the AGB 490 includes a V-shaped cross-section defined by a first arm 530 and a second arm 532. The first arm 530 extends from an accessory gearbox axis 492 to a first terminating point or first distal surface 534. The first distal surface 534 can have a first end point 536 defined as the point on the first distal surface 534 that is radially farthest from the turbine engine axis of rotation 12. A first distance 540 can be measured radially from the accessory gearbox axis 492 to the first end point 536.

The first arm 530 can include a first plane 544. The two dimensions defining the first plane 544 are illustrated by way of example as a first dimension that is generally perpendicular to the first distal surface 534 and a second dimension is into/out of the page. It is further contemplated that the first plane 544 can form any angle in either dimension with the first distal surface 534.

A primary set of interfaces 542a, 542b can be operably coupled to or defined by a portion of the first arm 530. The primary set of interfaces 542a, 542b can extend along or be defined by the first plane 544. While illustrated as two interfaces 542a, 542b that lie on the plane 544, any number of interfaces in the first plane 544, including one, are contemplated.

The first arm 530 can define a first arm axis of rotation 546. It is contemplated that the rotation of an output shaft or other portion of the first arm 530 about the first arm axis of rotation 546 can be considered an interface. It is further contemplated that the first arm 530 can define any number of axes of rotations.

The first arm 530 can sweep a first arm length 551 from the accessory gearbox axis 492 to the first distal surface 534. The first arm 530 can cover between 5% and 50% of the engine core 44 or the core casing 46. It is contemplated that the first arm length 551 is between 1% and 60% the circumference of the engine core 44 or the core casing 46.

The second arm 532 extends from the plane of the accessory gearbox axis 492 to a second terminating point or second distal surface 554. The second distal surface 554 can have a second end point 556 defined as the point on the second distal surface 554 that is radially farthest from the turbine engine axis of rotation 12. A second distance 560 can be measured radially from the accessory gearbox axis 492 to the second end point 556. While illustrated as greater than the first distance 540, the second distance 560 can be less than or equal to the first distance 540. That is, the second portion 496 of the AGB 490 is spaced non-equidistant between the first end point 536 and the second end point 556, where the first end point 536 and the second end point 556 are defined by the arc cross-section.

The second arm 532 can include a second plane 564. The two dimensions defining the second plane 564 are illustrated by way of example as a first dimension that is generally perpendicular to the second distal surface 554 and a second dimension is into/out of the page. It is further contemplated that the second plane 564 can form any angle in either dimension with the second distal surface 554.

A secondary set of interfaces 562a, 562b can be operably coupled to or defined by a portion of the first arm 532. The secondary set of interfaces 562a, 562b can be defined by the second plane 564. While illustrated as two interfaces 562a, 562b that lie on or extend along the plane 564, any number of interfaces in the second plane 564, including one, are contemplated.

The second arm 532 can define a second arm axis of rotation 566. It is contemplated that the rotation of an output shaft or other portion of the second arm 532 about the second arm axis of rotation 566 can be considered an interface. It is further contemplated that the second arm 532 can define any number of axes of rotations.

The second arm 532 can have a second arm length 571 from the accessory gearbox axis 492 to the second distal surface 554. The second arm 532 can cover between 5% and 50% of the engine core 44 or the core casing 46. It is contemplated that the second arm length 571 is between 1% and 60% the circumference of the engine core 44 or the core casing 46. While illustrated as equal, the second arm length 571 can be greater than or less than the first arm length 551.

A third plane 574 can define a tertiary set of interfaces 572a, 572b can be included in a second portion 496 of the AGB 490. As illustrated, by way of non-limiting example, the second portion 496 of the AGB 490 can be perpendicular to the accessory gearbox axis 492. The tertiary set of interfaces 572a, 572b can extend along a third plane 574. It is contemplated that one or more of the tertiary set of interfaces 572a, 572b extends past the radial inner surface 86 of the outer cowl 82. That is, the AGB 490 can include the primary set of interfaces 542a, 542b defined by the first plane 544, the secondary set of interfaces 562a, 562b defined by the second plane 564, and the tertiary set of interfaces 572a, 572b defined by the third plane 574. Interfaces can include, but are not limited to systems, components, or other engine elements that receive energy from the rotation of the AGB 490 about the accessory gearbox axis 492. It is contemplated that the interfaces can include, but are not limited to any one or more of an output shaft, fuel pump, transfer gearbox, lubrication pump, air compressor, scavenge pump, electrical generator, fuel control, fuel pump, permanent magnet alternator, lubrication pump, or hydraulic pump. It is further contemplated that the second portion 496 of the AGB 490 can define any number of axes of rotations.

The third plane 574, similar to the first plane 544 and the second plane 564, includes two dimensions illustrated by way of example as a first dimension that is generally perpendicular to the accessory gearbox axis 492, extending radially outward from the longitudinal axis 12, and a second dimension is into/out of the page. Similar to the first plane 544 and the second plane 564, the third plane 574 can be defined by a plane defined by at least an obtuse angle extending from the yaw or pitch axis (i.e. from into/out of page, or top to bottom respectively in FIG. 1). It is further contemplated that the second plane 574 can form any angle in either dimension with the accessory gearbox axis 492.

As shown, by way of example, each of the respective pair of interfaces 542a, 542b, 562a and 562b, 572a, 572b or axes of rotations 546, 566 associated with the respective planes 544, 564, 574 are generally perpendicular to each other. However, it is contemplated that the angles between the interfaces 542a, 542b, 562a and 562b, 572a, 572b or the axes of rotations 546, 566 associated with the respective planes 544, 564, 574 can be any angle, including between 50 degrees to 100 degrees.

It is contemplated that any number of additional planes defining interfaces or axes of rotation can extend from or be defined by a first portion 494 or the second portion 496. It is also contemplated that the additional planes defining interfaces or axes of rotation can extend from or be defined by one or more portions of the first plane 544, second plane 564, the third plane 574, the first arm axis of rotation 546, the second arm axis of rotation 566, the accessory gearbox axis 492, the first arm length 551, or the second arm length 571.

Benefits of aspects of the disclosure include improved fuel efficiency. The core mounted accessory gearbox with components that tangentially extend beyond the inner cowl into the bifurcated airflow allows for a more aerodynamic fairing. That is, because a portion of the AGB is between the inner cowl and outer cowl the inner or outer cowls can be smaller and/or more streamlined or aerodynamic. The improved airflow through the cowls improves fuel efficiency.

The accessory gearbox, as described herein, can include a smaller inner cowl or outer cowl. The smaller inner cowl and/or outer cowl can also provide a cost and weight savings.

The core mounted accessory gearbox, as disclosed herein, improves maintainability and accessibility, as the accessory gearbox is located adjacent a point of entry to the turbine engine.

The core mounted accessory gear box, as disclosed herein, can be used for smaller applications, such as, but not limited to, regional aircrafts. The accessory gear box having the first portion between the core casing and the inner cowl and the second portion between the inner cowl and the outer cowl allows the accessory gear box to have a smaller first portion. The accessory gear box with the smaller first portion allows for the turbine engine 10 to have additional components, such as, but not limited to, reverse thruster components and/or a slim line nacelle fan cowl.

Further aspects of the disclosure are provided by the subject matter of the following clauses:

1. A turbine engine, comprising an engine core, an inner cowl radially spaced from the engine core and circumscribing the engine core, an outer cowl radially spaced from the inner cowl and circumscribing at least a portion of the inner cowl, and an accessory gearbox comprising a first portion located within the inner cowl and straddling the engine core and a second portion located between the inner cowl and the outer cowl.
2. The turbine engine of any preceding clause wherein the accessory gearbox defines an accessory gearbox axis that is parallel to a turbine engine axis of rotation.
3. The turbine engine of any preceding clause wherein the second portion of the accessory gearbox is perpendicular to the accessory gearbox axis.
4. The turbine engine of any preceding clause wherein the accessory gearbox includes a primary set of interfaces defined by a first plane, a secondary set of interfaces defined by a second plane, and a tertiary set of interfaces defined by a third plane.
5. The turbine engine of any preceding clause wherein the first portion of the accessory gearbox comprises a V-shaped cross-section.
6. The turbine engine of any preceding clause wherein the V-shaped cross-section defines a first surface perpendicular the first plane and a second surface perpendicular to the second plane.
7. The turbine engine of any preceding clause wherein the first portion of the accessory gearbox comprises a C-shaped or arc cross-section.
8. The turbine engine of any preceding clause wherein the arc cross-section defines a first end point and a second end point and the second portion of the accessory gearbox is spaced non-equidistant between the first end point and the second end point.
9. The turbine engine of any preceding clause wherein at least a part of the second portion of the accessory gearbox extends past an inner surface of the outer cowl.
10. The turbine engine of any preceding clause, further comprising a strut that extends radially from the inner cowl and operably couples the inner cowl and the outer cowl.
11. The turbine engine of any preceding clause wherein at least a part of the second portion of the accessory gearbox is located in the strut.
12. The turbine engine of any preceding clause wherein the engine core comprises at least a compressor section, a combustion section, and a turbine section in axial flow arrangement.
13. A turbine engine comprising a fan assembly defining an inlet, an engine core, an inner cowl radially spaced from the engine core and having an inside face circumscribing at least a portion of the engine core, an outer cowl radially spaced from the inner cowl and circumscribing at least a portion of the inner cowl, a bifurcated airflow path comprising a first portion extending from the inlet through the engine core and a second portion extending from the inlet through a secondary airflow path defined between the inner cowl and the outer cowl, and an accessory gearbox having a first portion located within the inner cowl and a second portion, located in the secondary airflow path.
14. The turbine engine of any preceding clause, further comprising a strut that extends radially through the secondary airflow path and coupling the inner cowl and the outer cowl, wherein the second portion of the accessory gearbox is located in the strut.
15. The turbine engine of any preceding clause wherein the accessory gearbox defines an accessory gearbox axis that is parallel to a turbine engine axis of rotation.
16. The turbine engine of any preceding clause wherein the accessory gearbox includes a primary set of interfaces defined by a first plane, a secondary set of interfaces defined by a second plane, and a tertiary set of interfaces defined by a third plane.
17. The turbine engine of any preceding clause wherein the second portion of the accessory gearbox is perpendicular to the accessory gearbox axis.
18. The turbine engine of any preceding clause wherein the first portion of the accessory gearbox comprises a C-shaped or arc cross-section.
19. The turbine engine of any preceding clause wherein the arc cross-section defines a first end point and a second end point and the second portion of the accessory gearbox is spaced non-equidistant between the first end point and the second end point.
20. The turbine engine of any preceding clause wherein at least a part of the second portion of the accessory gearbox extends past an inner surface of the outer cowl.

What is claimed is:

1. A turbine engine, comprising:
a fan assembly defining an inlet;
an engine core;
an inner cowl radially spaced from the engine core and circumscribing the engine core;
an outer cowl radially spaced from the inner cowl and circumscribing at least a portion of the inner cowl, the outer cowl including a radially inner surface;
a bifurcated airflow path comprising a first portion extending from the inlet through the engine core and a second portion extending from the inlet through a secondary airflow path defined between the inner cowl and the outer cowl; and an accessory gearbox comprising:
  a first portion located within the inner cowl and straddling the engine core, the first portion comprising:
    a first arm, wherein a primary set of interfaces is defined by a portion of the first arm; and
    a second arm, wherein a secondary set of interfaces is defined by a portion of the second arm; and
  a second portion located between the inner cowl and the radially inner surface of the outer cowl, wherein the second portion defines a base from which the first arm and the second arm of the first portion extend to define a Y-shaped object, and wherein a tertiary set of interfaces is defined by the second portion of the accessory gearbox; and
  one or more of a fuel pump, transfer gearbox, lubrication pump, air compressor, scavenge pump, electrical generator, fuel control, permanent magnet alternator, or hydraulic pump operably coupled to the tertiary set of interfaces.

2. The turbine engine of claim 1, wherein the accessory gearbox defines an accessory gearbox axis that is parallel to a turbine engine axis of rotation.

3. The turbine engine of claim 2, wherein the accessory gearbox includes the primary set of interfaces defined by a first plane, the secondary set of interfaces defined by a second plane, and the tertiary set of interfaces defined by a third plane.

4. The turbine engine of claim 3, wherein a first angle is defined from the third plane to the first plane when rotating in a clockwise direction, wherein the first angle is greater than zero degrees and less than 180 degrees.

5. The turbine engine of claim 4, wherein a second angle is defined from the third plane to the second plane when rotating in a counterclockwise direction, wherein the second angle is greater than zero degrees and less than 180 degrees.

6. The turbine engine of claim 5, wherein the first angle or the second angle are greater than zero degrees and less than 90 degrees.

7. The turbine engine of claim 3, wherein the first portion of the accessory gearbox comprises a V-shaped cross-section, wherein the V-shaped cross-section defines a first surface perpendicular the first plane and a second surface perpendicular to the second plane.

8. The turbine engine of claim 1, further comprising a strut that extends radially from the inner cowl and operably couples the inner cowl and the outer cowl.

9. The turbine engine of claim 8, wherein at least a part of the second portion of the accessory gearbox is located in the strut.

10. The turbine engine of claim 9, further comprising an upper strut spaced from the strut, wherein the upper strut couples the inner cowl and the outer cowl.

11. The turbine engine of claim 1, wherein the accessory gearbox is mounted to the engine core with a hinge mount.

12. The turbine engine of claim 1, wherein the Y-shaped object operably coupled to the primary set of interfaces, the secondary set of interfaces, and the tertiary set of interfaces is a first fork, wherein the turbine engine further comprises a set of forks including, at least, the first fork and a second fork.

13. The turbine engine of claim 12, the first fork and the second fork are coupled by one or more of a drive shaft, a gearbox, or a hydraulic drive.

14. The turbine engine of claim 13, wherein the one or more of a drive shaft, a gearbox, or a hydraulic drive further comprises one or more casings positioned between the first fork and the second fork.

15. A turbine engine, comprising:
a fan assembly defining an inlet;
an engine core;
an inner cowl radially spaced from the engine core and circumscribing the engine core;
an outer cowl radially spaced from the inner cowl and circumscribing at least a portion of the inner cowl, the outer cowl including a radially inner surface;
a bifurcated airflow path comprising a first portion extending from the inlet through the engine core and a second portion extending from the inlet through a secondary airflow path defined between the inner cowl and the outer cowl; and
an accessory gearbox comprising:
  a first portion located within the inner cowl and straddling the engine core, the first portion comprising:
    a first arm, wherein a primary set of interfaces is defined by a portion of the first arm; and
    a second arm, wherein a secondary set of interfaces is defined by a portion of the second arm; and
  a second portion located between the inner cowl and the radially inner surface of the outer cowl, wherein the second portion defines a base from which the first arm and the second arm of the first portion extend to define a Y-shaped object, and wherein a tertiary set of interfaces is defined by the second portion of the accessory gearbox.

16. A turbine engine, comprising:
a fan assembly defining an inlet;
an engine core;
an inner cowl radially spaced from the engine core and circumscribing the engine core;
an outer cowl radially spaced from the inner cowl and circumscribing at least a portion of the inner cowl, the outer cowl including a radially inner surface;
a bifurcated airflow path comprising a first portion extending from the inlet through the engine core and a second portion extending from the inlet through a secondary airflow path defined between the inner cowl and the outer cowl;
a strut that extends radially from the inner cowl and operably couples the inner cowl and the outer cowl; and
an accessory gearbox having an accessory gearbox housing, the accessory gearbox comprising:
  a first portion located within the inner cowl and straddling the engine core, the first portion comprising:
    a first arm, wherein a primary set of interfaces is defined by a portion of the first arm; and
    a second arm, wherein a secondary set of interfaces is defined by a portion of the second arm; and
  a second portion located between the inner cowl and the radially inner surface of the outer cowl, wherein the second portion extends from the first arm and the second arm of the first portion to define a single fork, and wherein a tertiary set of interfaces is defined by the second portion of the accessory gearbox, wherein the accessory gearbox housing includes the single fork and is located partially in the inner cowl and partially in the strut; and
one or more of a fuel pump, transfer gearbox, lubrication pump, air compressor, scavenge pump, electrical generator, fuel control, permanent magnet alternator, or hydraulic pump operably coupled to the tertiary set of interfaces.

17. The turbine engine of claim 16, wherein the first portion of the accessory gearbox comprises a C-shaped or arc cross-section.

18. The turbine engine of claim 17, wherein the arc cross-section defines a first end point and a second end point and the second portion of the accessory gearbox is spaced non-equidistant between the first end point and the second end point.

19. The turbine engine of claim 18, wherein the first arm includes a first arm distance measured from an accessory gearbox axis to a first distal surface or the first end point, wherein the first arm distance is between 5% and 50% of a circumference of the engine core or a core casing.

20. The turbine engine of claim 19, wherein the second arm includes a second arm distance measured from the accessory gearbox axis to a second distal surface or the second end point, wherein the second arm distance is between 5% and 50% of a circumference of the engine core or the core casing.

* * * * *